US012584519B2

(12) United States Patent
Bedenk et al.

(10) Patent No.: US 12,584,519 B2
(45) Date of Patent: Mar. 24, 2026

(54) DOUBLE-ROW BALL BEARING

(71) Applicant: Schaeffler Technologies AG & Co. KG, Herzogenaurach (DE)

(72) Inventors: Johannes Bedenk, Theres (DE); Vittal Murti, Stratford (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 224 days.

(21) Appl. No.: 18/559,890

(22) PCT Filed: May 2, 2022

(86) PCT No.: PCT/DE2022/100326
§ 371 (c)(1),
(2) Date: Nov. 9, 2023

(87) PCT Pub. No.: WO2022/237933
PCT Pub. Date: Nov. 17, 2022

(65) Prior Publication Data
US 2024/0376934 A1 Nov. 14, 2024

(30) Foreign Application Priority Data

May 10, 2021 (DE) .......................... 102021112133.7

(51) Int. Cl.
| | |
|---|---|
| *F16C 23/08* | (2006.01) |
| *F16C 19/18* | (2006.01) |
| *F16C 21/00* | (2006.01) |
| *F16C 33/66* | (2006.01) |

(52) U.S. Cl.
CPC .......... *F16C 23/084* (2013.01); *F16C 19/184* (2013.01); *F16C 21/00* (2013.01); *F16C 33/6614* (2013.01); *F16C 2326/43* (2013.01)

(58) Field of Classification Search
CPC ...... F16C 19/184; F16C 23/08; F16C 23/082; F16C 23/084; F16C 25/08; F16C 2326/43; F16C 21/00; F16C 33/6614
See application file for complete search history.

(56) References Cited

U.S. PATENT DOCUMENTS

| | | | | |
|---|---|---|---|---|
| 1,262,208 | A * | 4/1918 | Kelly | .................... F16C 23/084 384/504 |
| 1,364,675 | A | 1/1921 | Johan | |
| 6,168,530 | B1 * | 1/2001 | Guimbal | ................ B64D 35/00 464/178 |
| 9,631,516 | B2 * | 4/2017 | Hamann | ................. B64C 27/82 |
| 2002/0081047 | A1 * | 6/2002 | Zoppitelli | ............. F16C 35/045 384/536 |

FOREIGN PATENT DOCUMENTS

| | | |
|---|---|---|
| DE | 1118017 B | 11/1961 |
| DE | 2518129 A1 | 11/1976 |
| DE | 19836729 C1 | 4/2000 |

(Continued)

*Primary Examiner* — Alan B Waits
(74) *Attorney, Agent, or Firm* — Volpe Koenig

(57) ABSTRACT

A double-row ball bearing, in particular for adjusting the blades of a tail rotor of a helicopter, including an inner ring and an outer ring as the bearing rings, and balls rolling off between the bearing rings and designed to transmit axial forces between the bearing rings in both directions, the outer ring being tiltably supported in a housing part.

12 Claims, 1 Drawing Sheet

(56)         References Cited

FOREIGN PATENT DOCUMENTS

| | | | |
|----|----|----|----|
| DE | 102006028200 | A1 | 12/2007 |
| DE | 102006034729 | B3 | 1/2008 |
| DE | 102008061832 | A1 | 8/2009 |
| DE | 102010053671 | A1 | 6/2012 |
| DE | 102011078840 | A1 | 1/2013 |
| DE | 102012220261 | A1 | 5/2014 |
| DE | 102012224148 | A1 | 7/2014 |
| DE | 102014221949 | B3 | 2/2016 |
| DE | 102015213970 | A1 | 11/2016 |
| DE | 102017129773 | A1 | 6/2019 |
| EP | 2952760 | B1 | 12/2015 |
| EP | 3023328 | B1 | 5/2018 |
| EP | 2412630 | B1 | 9/2019 |
| EP | 3753850 | A1 | 12/2020 |
| FR | 427930 | A | 8/1911 |

* cited by examiner

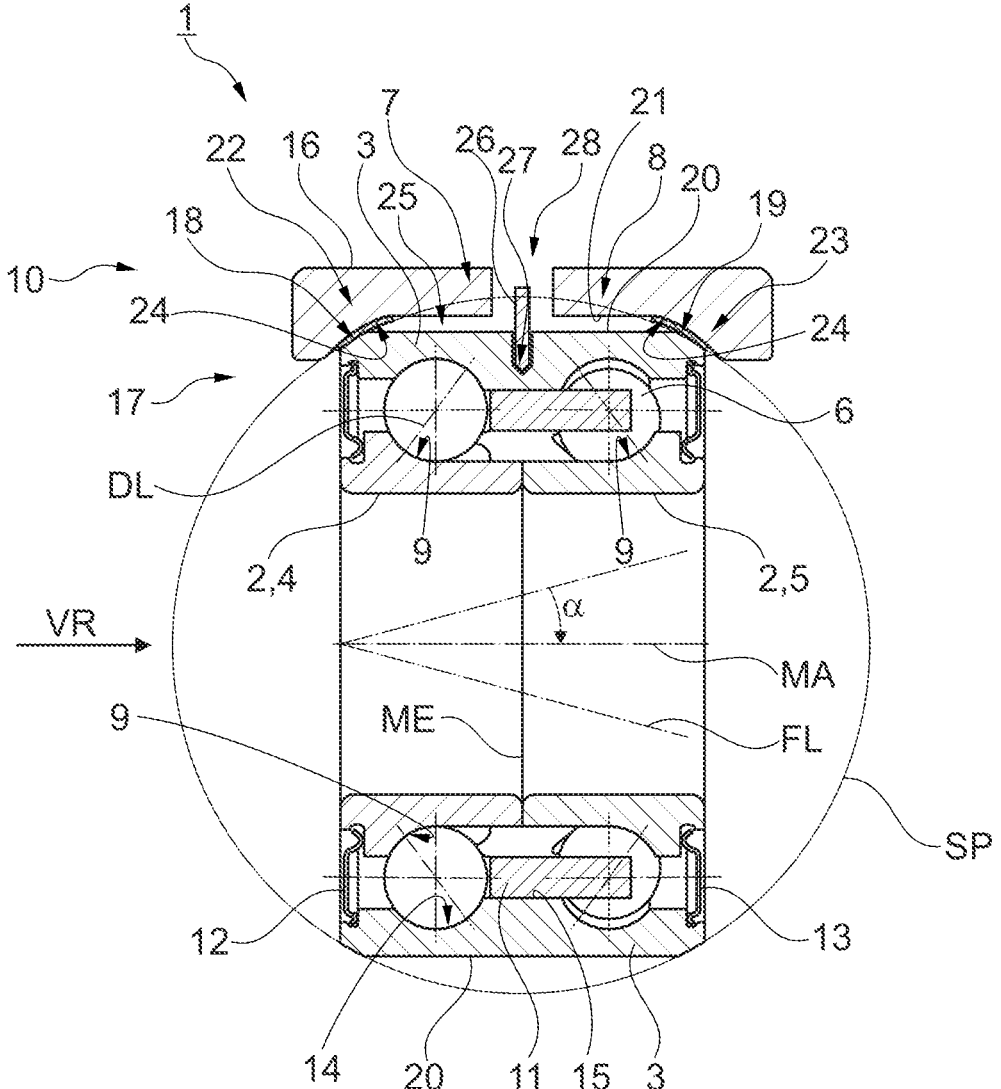

DOUBLE-ROW BALL BEARING

CROSS-REFERENCE TO RELATED APPLICATIONS

This application is the U.S. National Phase of PCT Appln. No. PCT/DE2022/100326, filed May 2, 2022, which claims the benefit of German Patent Appln. No. 102021112133.7, filed May 10, 2021, the entire disclosures of which are incorporated by reference herein.

TECHNICAL FIELD

The disclosure relates to a double-row ball bearing which is suitable for the transmission of radial forces and for the transmission of axial forces in both directions.

BACKGROUND

A possible design of a double-row ball bearing is described, for example, in DE 10 2008 061 832 A1. In this case, the bearing is sealed on both sides, with a free space being present between the rows of rolling bodies. In contrast, in a double-row ball bearing known from DE 10 2015 213 970 A1, the rows of balls are arranged in such a way that the axial distance between the rows of balls is smaller than the ball diameter.

DE 25 18 129 A1 discloses a thin-walled race that can be produced without cutting for a single-row ball bearing. The raceway may have slight adjustment movement relative to a seating surface to accommodate shaft deflection or shaft misalignment.

DE 10 2006 034 729 B3 discloses a double-row spherical roller or ball bearing. This bearing, which is intended in particular for steering spindles of motor vehicles, is intended to provide low-play mounting, with both inner ring raceways and outer ring raceways being formed by sheet metal.

DE 10 2006 028 200 A1 describes an angularly adjustable rolling bearing which is designed as a rolling bearing. An outer ring of the roller bearing is designed in one piece and is arranged substantially without play in a spherical inner surface of a housing. The inner surface of the housing has a coating so that there is a sliding pairing with very little friction. Alternatively, the outer surface of the outer ring can be coated. Phosphating and an Elgoglide coating are mentioned as possible coatings.

DE 10 2014 221 949 B3 discloses a self-aligning angular contact ball bearing which is designed as a tandem bearing and is therefore suitable for transmitting axial forces in exactly one direction. Contact angle axes of two rows of rolling bodies are oriented parallel to one another.

Heavy-duty bearing arrangements that are able to compensate for misalignments are in many cases designed as double-row spherical roller bearings. In this context, reference is made by way of example to documents DE 10 2012 220 261 A1, DE 10 2012 224 148 A1 and DE 10 2011 078 840 A1. A possible cage for a spherical roller bearing is described in detail in DE 10 2017 129 773 A1, for example.

Spherical roller bearings are able to absorb radial and axial forces and are used in a wide variety of stationary and mobile applications, including in aircraft. A cage for a double-row spherical roller bearing which is intended for use in an aircraft is disclosed, for example, in EP 2 952 760 B1.

Helicopters with a single main rotor are known to be equipped with a tail rotor for torque balancing. In this context, reference is made by way of example to documents DE 1 118 017 A and EP 3 023 328 B1.

DE 10 2010 053 671 A1 describes a multi-row rolling bearing, the outer ring of which has an outer surface that is at least partially spherical and which can or does interact with an inner surface of a housing that is at least partially spherical. A row of bearings is formed by a row of angular contact ball bearings.

The tail rotor generates a torque about the vertical axis, i.e. the yaw axis of the helicopter. If the angle of attack of the tail rotor blades is adjusted, the moment generated by the tail rotor also changes. This adjustment can be brought about by the pilot, in particular by means of pedals, the actuation of the pedals being converted into an adjustment of the angle of attack of the at least two blades of the tail rotor via a linear drive.

In principle, a tail rotor of a helicopter can be driven in any way. An electrical drive of a tail rotor is described, for example, in EP 2 412 630 B1.

SUMMARY

The disclosure is based on the object of specifying a rolling bearing arrangement which has been developed further than the mentioned prior art and which is particularly suitable for use in a tail rotor of a helicopter which has blade adjustment system.

According to the disclosure, this object is achieved by a double-row ball bearing having the features of claim 1. The ball bearing comprises an inner ring and an outer ring as bearing rings, as well as rolling bodies, i.e. balls, rolling between the bearing rings and intended for the transmission of axial forces between the bearing rings in both directions, with the outer ring being mounted in a housing part so that it can be tilted to a limited extent.

Due to the tiltable mounting of the outer ring in the housing part, misalignments between the inner ring and outer ring on the one hand and the housing part on the other hand can be compensated for. In particular, the tilting bearing, which is formed by the outer ring and the housing part as plain bearing components, is able to absorb tilting of $\pm 2°$ or more. A tilting moment can be transferred from the inner ring to the outer ring via the rolling bodies without tilting the inner ring significantly relative to the outer ring. The tilting thus occurs exclusively or almost exclusively between the outer ring and the housing part.

According to one possible embodiment, the plain bearing comprises a first pair of sliding surfaces, which are formed by the outer ring or the housing part, and a second pair of sliding surfaces, which are formed in a corresponding manner. Each pair of sliding surfaces constitutes an overall annular plain bearing section, the plain bearing sections being spaced apart from one another and—as long as there is no tilting—being arranged mirror-symmetrically with respect to a center plane of the ball bearing. Each plain bearing section can absorb radial forces and axial forces in exactly one direction.

Sliding linings of the tilting bearing can be located on the outer ring or in the housing part that makes contact with the outer ring. In any case, ideal kinematics of the tilting bearing can be realized in that the two sliding surfaces of the outer ring, which are designed as annular, spaced apart, convexly curved surface sections, lie on one and the same imaginary spherical surface. The same applies to the inner surface of the housing part, insofar as this is designed as a sliding surface. If a tilting movement between the outer ring and the housing part is to be countered by a resistance that rises with an increasing tilting angle, according to an optional embodiment, the regions of the otherwise spherical inner surface, serving as a sliding surface, of the housing part which are spaced furthest from one another in the axial direction can have a shape which deviates from a spherical shape for this purpose.

According to an advantageous further development, a lubricant chamber is formed between the two convexly curved sliding surfaces of the outer ring, an outer circumferential surface, lying between said sliding surfaces in the axial direction of the ball bearing, of the outer ring and an inner circumferential surface of the housing part, which is filled in particular with grease as a lubricant. Here, the outer circumferential surface of the outer ring, insofar as it lies between the sliding surfaces, can be cylindrical. Likewise, the inner circumferential surface of the housing part which delimits the lubricant chamber can be at least partially cylindrical.

The housing part designed as a plain bearing component can be a housing ring which is coupled in a rotationally fixed manner to the outer ring during intended operation, i.e. when the inner ring can rotate freely relative to the outer ring.

A rotationally fixed coupling, which at the same time allows limited tilting, between the outer ring and the housing ring is produced, for example, by a predetermined breaking element, in particular in the form of a pin, with the predetermined breaking element being used to release a relative rotation between the outer ring and the housing part when a maximum torque acting between the inner ring and the housing part is exceeded.

This means that the tilting bearing functions as a rotary plain bearing as soon as the rolling bearing fails or is too stiff. It is precisely in such a case, that is to say in an emergency mode, that a lubricant supply disposed between a cylindrical outer circumferential surface of the outer ring and an inner circumferential surface of the housing part is advantageous.

The double-row ball bearing is designed, for example, as a bearing in an O-arrangement. Alternatively, an X arrangement can be considered. In any case, the double-row ball bearing can be sealed on both sides. The lubricant that is in the interior of the rolling bearing is not necessarily identical to the lubricant used to lubricate the emergency plain bearing. In particular, oil can be provided for rolling bearing lubrication.

The bearing rings can be constructed in one or more parts. In typical embodiments, the outer ring is the rotating bearing ring and the inner ring is the non-rotating bearing ring. Designs can also be realized in which the inner ring constitutes the rotating bearing ring or both bearing rings rotate.

BRIEF DESCRIPTION OF THE DRAWINGS

In the following, an exemplary embodiment of the disclosure is explained in more detail with reference to a drawing. In the drawings:

FIG. 1 shows a double-row ball bearing in a sectional view.

DETAILED DESCRIPTION

A rolling bearing 1 designed as a double-row ball bearing is part of a blade adjustment system, denoted overall by 10, of a tail rotor of a helicopter. The rolling bearing 1 has an inner ring 2 and an outer ring 3 as bearing rings, with the inner ring 2 being formed in two parts in the present case, namely consisting of a first inner ring part 4 and an identically shaped inner ring part 5 arranged in a mirror-inverted manner in relation thereto. Each inner ring part 4, 5 provides an inner ring raceway 9, on which balls roll as rolling bodies 6. The balls 6, which are also in contact with the outer ring raceways 14, are thus arranged in the form of two rows of rolling bodies 7, 8. A center plane ME, which is placed between the inner ring parts 4, 5, is located in the middle between the rows of rolling bodies 7, 8. Pressure lines through the centers of the rolling bodies 6 are denoted by DL. For example, the rolling bearing 1 is a double-row bearing in an O-arrangement. In contrast to the inner ring 2, the one-piece outer ring 3 has an annular central web 15, to which the outer ring raceways 14 are connected. The rolling bodies 6 are guided in a cage 11. Seals disposed on both end faces of the rolling bearing 1 are denoted by 12, 13.

The outer ring 3 is accommodated in a housing part 16, which is designed as a housing ring. A tilting bearing in the form of a plain bearing 17 is formed between the housing ring 16 and the outer ring 3. In the non-tilted setting of the rolling bearing 1 shown in FIG. 1, the annular components 2, 3, 16 have a uniform central axis MA. If the inner ring 2 and the outer ring 3 with it also are tilted relative to the housing part 16, which means a misalignment, the result is an angle α, shown exaggerated in FIG. 1, between an axis FL and the central axis MA. The tilting by the angle α is completely absorbed by the tilting bearing 17 and can be up to 2°.

When the blade adjustment system 10 is operated as intended, the outer ring 3 rotates together with the housing ring 16, while the inner ring 2 constitutes a stationary bearing ring. A blade of the tail rotor is adjusted by the inner ring 2 being displaced in the adjustment direction VR, i.e. along the central axis MA. In this case, the outer ring 3 and the housing ring 16 rotating with it are inevitably also displaced. Any slight tilting between the outer ring 3 and the housing ring 16 is insignificant in this adjustment process on account of the tilting bearing 17.

The tilting bearing 17 comprises two annular sliding surfaces 18, 19 which are provided by the outer ring 3 and define a spherical shape SP. The two mutually spaced sliding surfaces 18, 19 adjoin the end faces of the outer ring 3 and are arranged mirror-symmetrically with respect to the center plane ME. A substantially cylindrical outer circumferential surface 20 of the outer ring 3 is disposed between the two sliding surfaces 18, 19. The outer circumferential surface 20 is concentrically surrounded by an inner circumferential surface 21 of the housing ring 16. The plain bearing sections denoted by 22, 23, which are each formed on the one hand by one of the sliding surfaces 18, 19 and on the other hand by a sliding lining 24 on the housing ring 16, adjoin the inner circumferential surface 21. A lubricant chamber 25 filled with grease is formed between the outer circumferential surface 20 of the outer ring 3 and the inner circumferential surface 21 of the housing part 16.

As long as the outer ring 3 is freely rotatable relative to the inner ring 2, the plain bearing 17 has the sole function of a tilting bearing. Each rotation of the outer ring 3 about the central axis MA is accompanied by a corresponding rotation of the housing ring 16 about the central axis MA. For this purpose, a pin 26 is firmly inserted into a bore 27 in the outer ring 3. The pin 26 simultaneously engages in an opening 28 which is disposed in the housing part 16.

As can be seen from FIG. 1, the pin 26 in the opening 28 has significant play in the longitudinal direction of the central axis MA. This play enables the described tilting of up to 2° between the outer ring 3 and the housing ring 16. On the other hand, in the direction orthogonal to this, that is to say in the circumferential direction of the outer ring 3 and of the housing ring 16, there is no or only minimal play of the pin 26. Relative rotations between the outer ring 3 and the housing ring 16 are thus excluded. However, if excessive forces occur between the outer ring 3 and the housing part 16, which in extreme cases can be attributed to a blockage between the inner ring 2 and the outer ring 3, the pin 26 breaks, thus representing a predetermined breaking element. At this moment, rotation between the outer ring 3 and the housing ring 16 is released, which means that the plain bearing 17 is converted into a rotary bearing. In this state, the lubricant supply disposed in the lubricant chamber 25 contributes significantly to heat dissipation. The kinematics of the blade adjustment system 10 are retained even in the case of this emergency function of the plain bearing 17, which otherwise only serves as a tilting bearing.

LIST OF REFERENCE SIGNS

1 Rolling bearing, double-row ball bearing
2 Inner ring
3 Outer ring
4 Inner ring part
5 Inner ring part
6 Rolling body, ball
7 Row of rolling bodies
8 Row of rolling bodies
9 Inner ring raceway
10 Blade adjustment system
11 Cage
12 Seal
13 Seal
14 Outer ring raceway
15 Central web
16 Housing part, housing ring
17 Plain bearing, tilting bearing
18 Sliding surface of the outer ring
19 Sliding surface of the outer ring
20 Outer circumferential surface
21 Concave inner circumferential surface
22 Plain bearing section
23 Plain bearing section
24 Sliding lining
25 Lubricant chamber
26 Pin, predetermined breaking element
27 Bore in the outer ring
28 Opening in the housing part
α Angle
DL Pressure line
FL Axis of the inner ring with misalignment
MA Central axis
ME Center plane
SP Spherical shape
VR Adjustment direction
The invention claimed is:

1. A double-row ball bearing comprising:
an inner ring and an outer ring, and balls which roll between the inner ring and outer ring and configured to transmit axial forces between the inner ring and outer ring in both axial directions, wherein the outer ring is tiltably mounted in a housing part,
wherein the outer ring has two annular, mutually spaced, convexly curved surface sections defining sliding surfaces which describe one and the same spherical surface,
wherein the housing part is configured as a housing ring coupled to the outer ring in a rotationally fixed manner, whereby during operation the inner ring can rotate freely relative to the outer ring, and
further comprising a predetermined breaking element rotationally coupling the housing ring to the outer ring, the predetermined breaking element allowing limited tilting, between the outer ring and the housing ring, the predetermined breaking element configured to release a relative rotation between the outer ring and the housing part when a maximum torque acting between the inner ring and the outer ring is exceeded.

2. The ball bearing according to claim 1, wherein the outer ring and the housing part comprise a tilting bearing configured as a plain bearing.

3. The ball bearing according to claim 2, wherein a lubricant chamber is formed between the sliding surfaces of the outer ring, an outer circumferential surface of the outer ring lying between said sliding surfaces in the axial direction, and an inner circumferential surface of the housing part.

4. The ball bearing according to claim 3, wherein the inner circumferential surface, delimiting the lubricant chamber, of the housing part is at least partially cylindrical.

5. The ball bearing according to claim 1, wherein the outer ring is supported in the housing part to allow a tilting between the outer ring and the housing part of at least ±2°.

6. The ball bearing according to claim 1, configured as a double-row bearing in an O-arrangement.

7. A method comprising:
providing a double-row ball bearing having an inner ring and an outer ring, and balls which roll between the inner ring and outer ring and configured to transmit axial forces between the inner ring and outer ring in both axial directions, wherein the outer ring is tiltably mounted in a housing part, and wherein the outer ring has two annular, mutually spaced, convexly curved surface sections defining sliding surfaces which describe one and the same spherical surface, wherein the housing part is configured as a housing ring coupled to the outer ring in a rotationally fixed manner, whereby during operation the inner ring can rotate freely relative to the outer ring, and further including a predetermined breaking element rotationally coupling the housing ring to the outer ring, the predetermined breaking element allowing limited tilting, between the outer ring and the housing ring, the predetermined breaking element configured to release a relative rotation between the outer ring and the housing part when a maximum torque acting between the inner ring and the outer ring is exceeded;
and
using the double-row ball bearing in a tail rotor of a helicopter which has a blade adjustment system.

8. The method according to claim 7, wherein the outer ring and the housing part comprise a tilting bearing configured as a plain bearing.

9. The method according to claim 8, wherein a lubricant chamber is formed between the sliding surfaces of the outer ring, an outer circumferential surface of the outer ring lying between said sliding surfaces in the axial direction, and an inner circumferential surface of the housing part.

10. The method according to claim 9, wherein the inner circumferential surface, delimiting the lubricant chamber, of the housing part is at least partially cylindrical.

11. The method according to claim 7, wherein the outer ring is supported in the housing part to allow a tilting between the outer ring and the housing part of at least ±2°.

12. The method according to claim 7, wherein the double-row bearing is in an O-arrangement.

\* \* \* \* \*